United States Patent
Huh et al.

(10) Patent No.: US 6,236,799 B1
(45) Date of Patent: May 22, 2001

(54) FLAT-PANEL DISPLAY DEVICE USING OPTICAL WAVEGUIDE

(75) Inventors: Chin-kyu Huh; Sang-yong Han, both of Seoul (KR); Si-ken Lee, S-Petersburg (RU); Jae-eun Yoo, Seoul (KR)

(73) Assignee: Iljin Corp., Seoul (KR)

( * ) Notice: Subject to any disclaimer, the term of this patent is extended or adjusted under 35 U.S.C. 154(b) by 0 days.

(21) Appl. No.: 09/324,917

(22) Filed: Jun. 3, 1999

(30) Foreign Application Priority Data

Jun. 3, 1998 (KR) .................................................. 98-20660

(51) Int. Cl.[7] ...................................................... G02B 6/00
(52) U.S. Cl. ............................ 385/147; 385/40; 385/130; 385/131; 385/901
(58) Field of Search ................................. 385/40, 41, 42, 385/130, 131, 132, 901, 147; 348/87, 88, 89, 90

(56) References Cited

U.S. PATENT DOCUMENTS

| 5,329,386 | * | 7/1994 | Birecki et al. | 359/42 |
| 5,353,133 | * | 10/1994 | Bernkopf | 359/41 |
| 5,442,467 | * | 8/1995 | Silverstein et al. | 359/42 |
| 5,764,845 | * | 6/1998 | Nagatani et al. | 385/901 X |
| 5,793,911 | * | 8/1998 | Foley | 385/901 X |
| 6,104,454 | * | 8/2000 | Hiyama et al. | 385/901 X |

FOREIGN PATENT DOCUMENTS

| 1-38725 | 2/1989 | (JP) | 385/901 X |
| 2-819 | 1/1990 | (JP) | 385/901 X |
| 3-296720 | 12/1991 | (JP) | 385/901 X |
| 5-307175 | 11/1993 | (JP) | 385/901 X |

* cited by examiner

Primary Examiner—Brian Healy
(74) Attorney, Agent, or Firm—Nixon & Vanderhye P.C.

(57) ABSTRACT

A flat-panel display device using an optical waveguide includes a light source for emitting light, a plurality of optical waveguides into which light emitted from the light source is incident, an optical waveguide arrangement substrate on which the plurality of optical waveguides are arranges and made of a material having a low refractive index so as to totally reflect the light transmitted through the plurality of optical waveguides, a light output controller positioned on the plurality of optical waveguides and made of a material whose refractive index changes according to an electric field, a light output portion positioned on the light output controller, for refracting the light having passed through the light output controller when the light propagated through the plurality of optical waveguides due to the electric field is transmitted through the light output controller and is output therefrom, and outputting the same to the outside, a first electrode positioned on the light output portion, made of a transparent conductive material, and to which a predetermined control voltage is applied, a second electrode positioned under the light output controller, made of a conductive material, and which forms an electric field in conjunction with the first electrode, and a driver for applying the predetermined control voltage to the first and second electrodes. Therefore, the resolution of a reproduced image can be greatly enhanced, the light efficiency is very high and the viewing angle is increased.

10 Claims, 8 Drawing Sheets

FLAT-PANEL DISPLAY DEVICE USING OPTICAL WAVEGUIDE

BACKGROUND OF THE INVENTION

1. Field of the Invention

The present invention relates to a flat-panel display device, and more particularly, to a flat-panel display device using an optical waveguide having high resolution of a reproduced image and high efficiency of light.

2. Description of the Related Art

Currently, cathode ray tubes (CRTs) are widely used as display devices for monitors or television sets. However, due to the drawbacks of the CRT being heavy and bulky, light flat-panel display devices such as liquid crystal display devices (LCDs) or plasma display devices are gradually being put into practical use. However, the LCDs are expensive and there are limits on the screen size. Plasma display devices are also expensive and consumes much power.

To overcome these disadvantages, display devices using optical waveguides have been developed. The optical waveguide is suitable for a display device having a large-sized screen because it can transmit bright light to a distant area with little attenuation of light.

FIG. 1 shows a conventional flat-panel display device using an optical waveguide.

The conventional flat-panel display device shown in FIG. 1 includes a core 15 into which the light output from a light source (not shown) is incident to then be propagated, a cladding 14 positioned on the core 15 and made of a material having a low refractive index so as to totally reflect the light propagated through the core 15, a light absorption layer 10 positioned on the cladding 14, for absorbing light, a first electrode 13 positioned on the light absorption layer 10 and to which a predetermined voltage is applied, an electro-optical material layer 16 positioned under the core and whose refractive index changes according to an electric field, a scattering layer 17 for scattering light, and a second electrode 18 which is grounded and made of a transparent material.

In the conventional flat-panel display device constructed as described above, if a predetermined voltage 12 is applied to the first electrode 13, an electric field 11 is generated between the first and second electrodes 13 and 18. The refractive index of the electro-optical material layer 16 increases due to the electric field 11 so that the light propagated through the core 15 passes through the electro-optical material layer 16 and collides with scattering particles in the scattering layer 17 to then be scattered. The light scattered in the scattering layer 17 passes through the second electrode 18 made of a transparent material so that light having passed through the second electrode 18 can be observed by a viewer.

However, in the aforementioned conventional flat-panel display device, since the scattering layer 17 has small particles causing scattering in all directions, the light incident into the scattering layer 17 is scattered in all directions and a considerable amount of light flux is reflected at the interface between the electro-optical material layer 16 and the scattering layer 17. Accordingly, only an extremely small amount of incident light is emitted to the outside. Thus, the light efficiency is very low.

Also, the conventional flat-panel display device cannot reduce the width of a waveguide for outputting light to less than a predetermined width because of its low output efficiency of light, which results in a limited resolution of a reproduced image.

SUMMARY OF THE INVENTION

To solve the above problems, it is an objective of the present invention to provide a flat-panel display device having high resolution of a reproduced image, high efficiency of light and a broad viewing angle.

Accordingly, to achieve the above objective, there is provided a flat-panel display device using an optical waveguide including a light source for emitting light, a plurality of optical waveguides into which light emitted from the light source is incident, an optical waveguide arrangement substrate on which the plurality of optical waveguides are arranges and made of a material having a low refractive index so as to totally reflect the light transmitted through the plurality of optical waveguides, a light output controller positioned on the plurality of optical waveguides and made of a material whose refractive index changes according to an electric field, a light output portion positioned on the light output controller, for refracting the light having passed through the light output controller when the light propagated through the plurality of optical waveguides due to the electric field is transmitted through the light output controller and is output therefrom, and outputting the same to the outside, a first electrode positioned on the light output portion, made of a transparent conductive material, and to which a predetermined control voltage is applied, a second electrode positioned under the light output controller, made of a conductive material, and which forms an electric field in conjunction with the first electrode, and a driver for applying the predetermined control voltage to the first and second electrodes.

The first electrode is preferably positioned under the optical waveguide arrangement substrate. Also, the plurality of optical waveguides are preferably cladding-free rectangular-section optical fibers. The light output controller is preferably a liquid crystal layer. Also, the light output portion may be formed of a plurality of cladding-free cylindrical optical fibers.

The flat-panel display device using an optical waveguide according to present invention may further include a transparent protective plate on which the first electrode is formed, wherein the protective plate is adhered to the light output portion by an optical adhesive.

Also, the light source is preferably a light source for emitting light of three primary colors for displaying colors, and each of the plurality of optical waveguides may further include three optical waveguides for propagating the light of three primary colors emitted from the light source.

Alternatively, the light source may be a white light source for displaying colors, each of the plurality of optical waveguides may further include three optical waveguides, and colors filters for three primary colors may be provided in front of the three optical waveguides to propagate the light emitted from the white light source into light of three primary colors.

Also, a gray scale control device for controlling the brightness of the light output from the light source may be further provided between the light source and the plurality of optical waveguides, and the brightness of the light output from the gray scale control device is preferably controlled in accordance with a light brightness control signal output from the driver.

Preferably, the gray scale control device includes a plurality of gray scale control units having a predetermined number of gray scale controllers formed in series, each gray scale controller including an optical waveguide into which the light emitted from the light source is incident, an optical waveguide arrangement substrate on which the optical waveguide is arranged and made of a material having a low refractive index so as to totally reflect the light transmitted through the optical waveguide, a light transmission controller positioned between the optical waveguide and the optical waveguide arrangement substrate and made of a material whose refractive index changes according to an electric field, a light absorption layer positioned under the light transmission controller, for absorbing the light transmitted to the light transmission controller when the light propagated through the optical waveguide is transmitted to the light transmission controller due to the electric field, third and fourth electrodes positioned on the optical waveguide, made of a conductive material and to which the light brightness control signal is applied from the driver, a fifth electrode positioned between the light absorption layer and the optical fiber arrangement substrate and made of a transparent material which produces electric fields in conjunction with the third and fourth electrodes, respectively, and a protective plate positioned on the optical waveguide and the third and fourth electrodes, for totally reflecting the light propagated through the optical waveguide.

Here, the areas of the light transmission controllers of the plurality of gray scale controllers are preferably made to be different from one another in order to delicately control the brightness of the light output from the gray scale control device.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
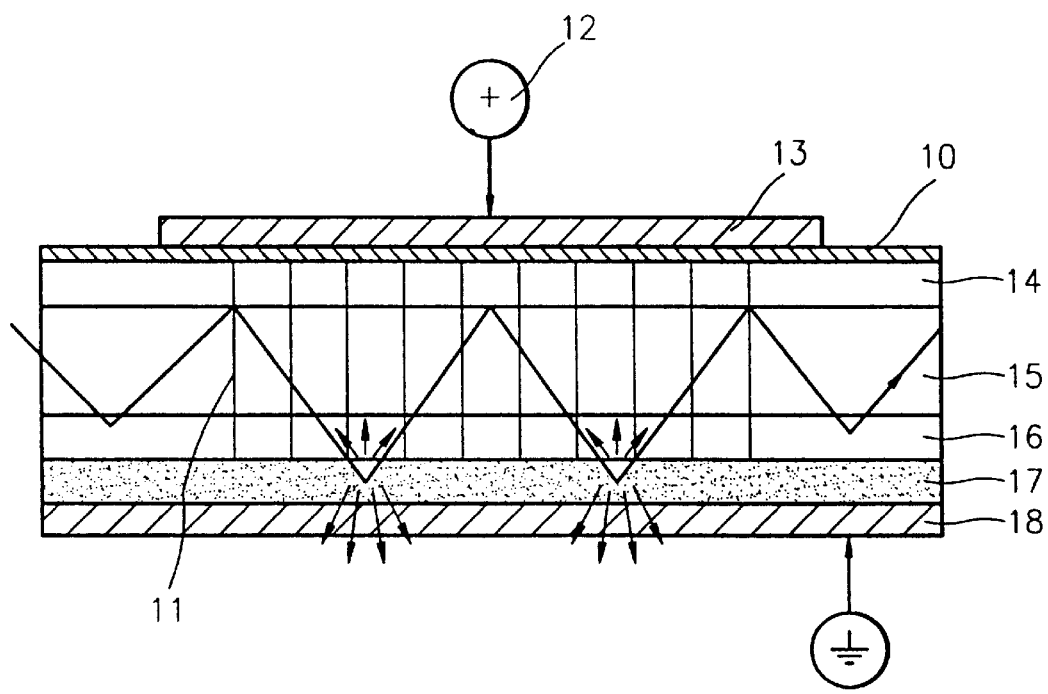
FIG. 1 is a diagram illustrating a conventional flat-panel display device using an optical waveguide.
Figure 2:
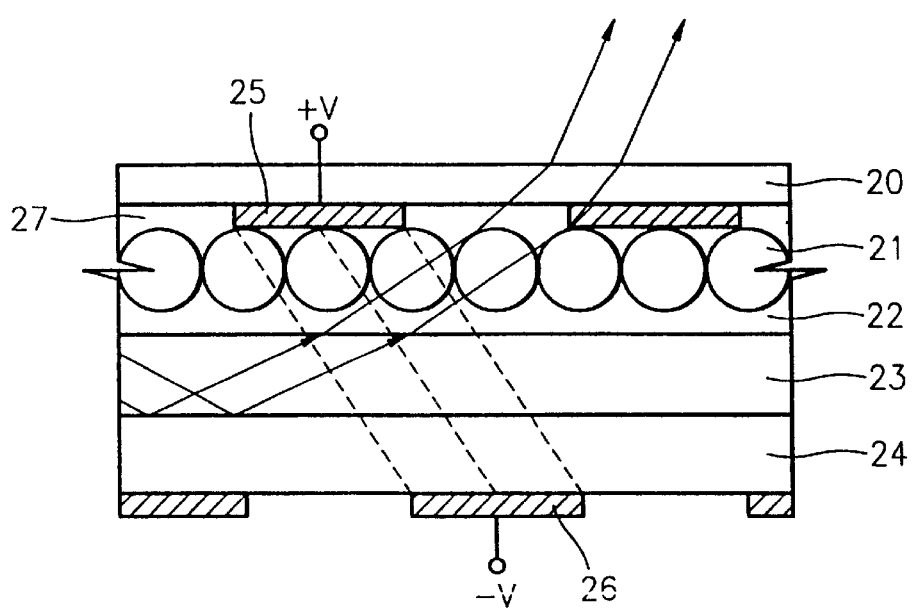
FIG. 2 is a diagram illustrating the display panel of a flat-panel display device using an optical waveguide according to the present invention.

FIG. 2 shows the display panel of a flat-panel display device using an optical waveguide according to the present invention.

The display panel shown in FIG. 2 includes a cladding-free rectangular-section optical fiber 23, an optical fiber arrangement substrate 24, a liquid crystal layer 22, a plurality of cladding-free cylindrical optical fibers 21, a first electrode 25 and a second electrode 26. The light emitted from a light source (not shown) is incident into the cladding-free rectangular-section optical fiber 23 to thus serve as an optical waveguide. The optical fiber arrangement substrate 24 is positioned under the cladding-free rectangular-section optical fiber 23 and is made of a material having a low refractive index to thus totally reflect the light propagated through the cladding-free rectangular-section optical fiber 23. The liquid crystal layer 22 is positioned on the cladding-free rectangular-section optical fiber 23 and is made of a material whose refractive index increases according to an electric field to thus serve as a light output controller. The plurality of cladding-free cylindrical optical fibers 21 are positioned on the liquid crystal layer 22, for refracting light having passed through the liquid crystal layer 22 when the light propagated through the cladding-free rectangular-section optical fiber 23 is transmitted to the liquid crystal layer 22 by the electric field and is output therefrom, and outputting the same to the outside. The first electrode 25 is positioned on the cladding-free cylindrical optical fibers 21, is made of a transparent conductive material, and a predetermined control voltage (+V) is applied thereto. The second electrode 26 is positioned under the optical fiber arrangement substrate 24 and is made of a conductive material. The second electrode 26 forms an electric field in conjunction with the first electrode 25. In FIG. 2, the second electrode 26 is positioned under the optical fiber arrangement substrate 24. However, the second electrode 26 may be positioned under the liquid crystal layer 22 or the cladding-free rectangular-section optical fiber 23, without being limited to the case shown in FIG. 2.

Also, a transparent protective plate 20 on which the first electrode 25 is formed is coupled to the cylindrical optical fibers 21 using an optical adhesive 27.

Figure 3:
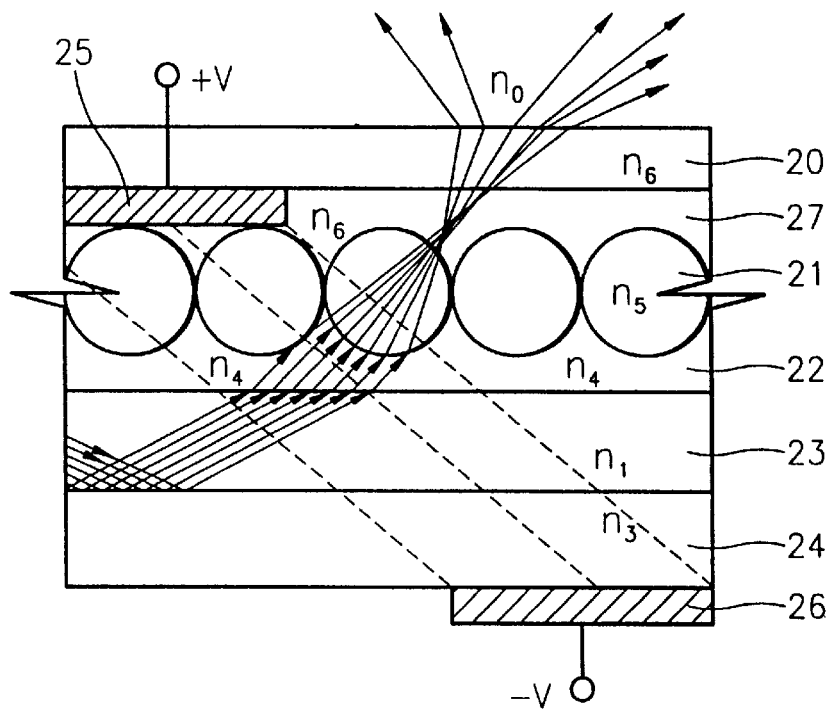
FIG. 3 is an enlarged view of FIG. 2 illustrating refraction of light flux.

The operation of the aforementioned flat-panel display device using an optical waveguide according to the present invention will now be described in view of the display panel shown in FIG. 3, which is an enlarged view of FIG. 2. In FIG. 3, $n_0$ represents the refractive index of the atmosphere, $n_1$ represents the refractive index of the cladding-free rectangular-section optical fiber 23, $n_3$ represents the refractive index of the optical fiber arrangement substrate 24, $n_4$ represents the refractive index of the liquid crystal layer 22 in the case where an electric field is not applied thereto, $n_4'$ represents the refractive index of the liquid crystal layer 22 in the case where an electric field is applied thereto, $n_5$ represents the refractive index of each of the cladding-free cylindrical optical fibers 21, and $n_6$ represents the refractive indices of the protective plate 20 and the optical adhesive 27.

Referring to FIG. 3, the light incident from a light source (not shown) installed outside the display panel travels through the cladding-free rectangular-section optical fiber 23, while satisfying a total reflection condition of a waveguide. Reflection is performed by the optical fiber arrangement substrate 24 and the liquid crystal layer 22 having refractive indices $n_3$ and $n_4$, respectively, which are relatively lower than the refractive index of the cladding-free rectangular-section optical fiber 23.

If predetermined voltages +V and −V are applied to the first and second electrodes 25 and 26, respectively, an electric field is formed between the first and second electrodes 25 and 26. This sharply increases the refractive index of the liquid crystal layer 22 positioned on the cladding-free rectangular-section optical fiber 23 so that $n_4' \geq 1.1 \times n_1$, that is, the total reflection condition is breached. Then, the light flux is almost entirely transmitted from the cladding-free rectangular-section optical fiber 23 to the liquid crystal layer 22 with a small angle of refraction to then be incident into the lateral surfaces of the cladding-free cylindrical optical fibers 21 each having a refractive index $n_5$ greater than that $n_4$ of the liquid crystal layer 22.

Here, the refractive index $n_5$ of each of the cladding-free cylindrical optical fibers 21 is appropriately adjusted so that the light flux converges around the exit side of the cladding-free cylindrical optical fibers 21. The light flux condensed from the cladding-free cylindrical optical fibers 21 is completely output to outside the protective plate 20 via the optical adhesive 27 and the protective plate 20 with a large angle of divergence.

When the cladding-free rectangular-section optical fiber 23 having a refractive index of $n_1$ and serving as an optical waveguide is covered by the liquid crystal layer 22, the condition for total reflection of the light traveling within the optical waveguide is expressed by formula (1):

$$\theta > \theta_c$$
$$\theta_c = \sin^{-1}(n_4/n_1)$$

where $\theta_c$ is critical angle. The light having an angle of incidence, $\theta$, which is greater than the critical angle $\theta_c$, is reflected at the interface between a liquid crystal layer and a waveguide. For example, when a liquid crystal layer having a refractive index of 1.45 is formed on a waveguide having a refractive index of 1.65, the light trapped within the waveguide cannot escape the waveguide in the range of the angle of incidence greater than the critical angle. However, if an external voltage is applied to the liquid crystal layer, an electric field is applied to the liquid crystal layer so that the refractive index of the liquid crystal increases by about 20% to be 1.74. Here, since the refractive index of the liquid crystal layer becomes larger than that of the waveguide, the light trapped within the waveguide is transmitted through the liquid crystal layer to then be output to the outside.

Figure 4:
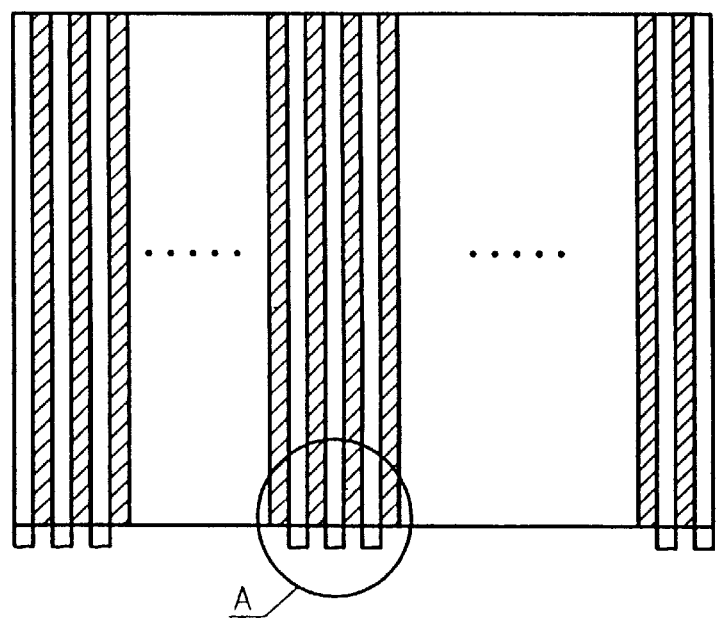
FIG. 4 is a front view of an optical fiber arrangement substrate.
Figure 5:
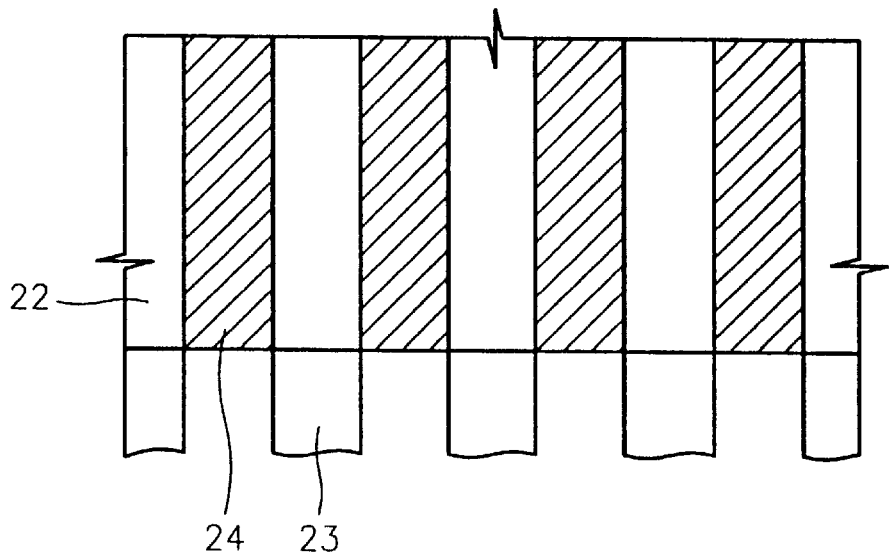
FIG. 5 is an enlarged view of the portion "A" shown in FIG. 4.
Figure 6:
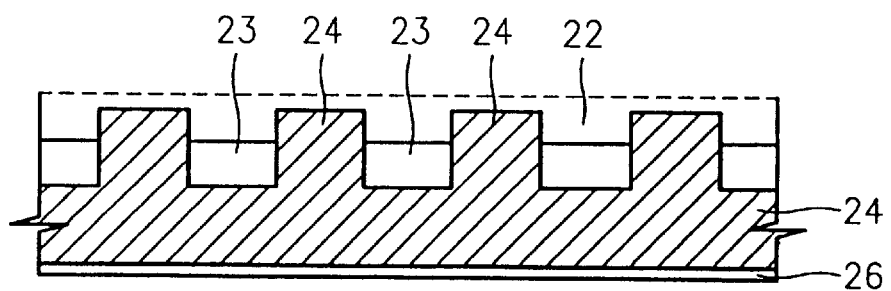
FIG. 6 is a cross-sectional view of FIG. 5.

FIG. 4 is a front view of an optical fiber arrangement substrate of a display panel on which cladding-free rectangular-section optical fibers are arranged, FIG. 5 is an enlarged view of the portion A: shown in FIG. 4, and FIG. 6 is a cross-sectional view of FIG. 5. Referring to FIGS. 5 and 6, cladding-free rectangular-section optical fibers 23 are arranged in rectangular grooves perpendicularly formed on an optical fiber arrangement substrate 24, a liquid crystal layer 22 is formed thereon, and a second electrode 26 is formed under the optical fiber arrangement substrate 24.

Figure 7:
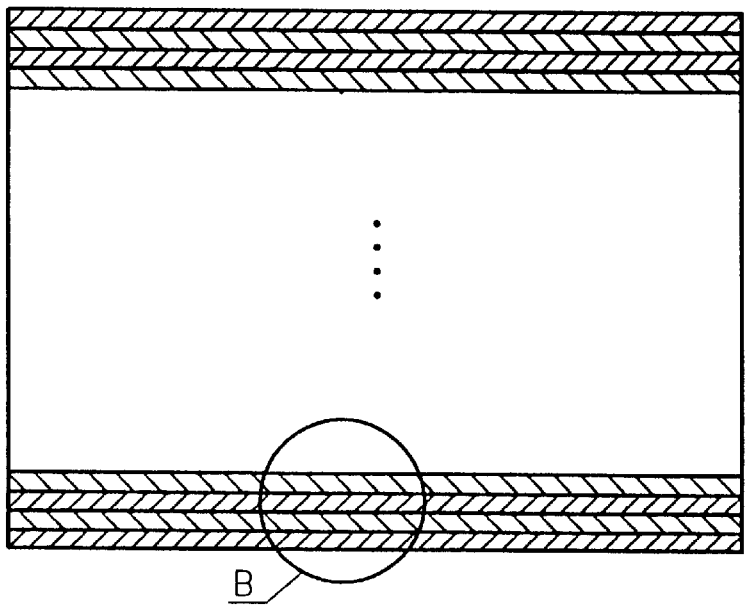
FIG. 7 is a rear view of the optical fiber arrangement substrate shown in FIG. 4.
Figure 8:
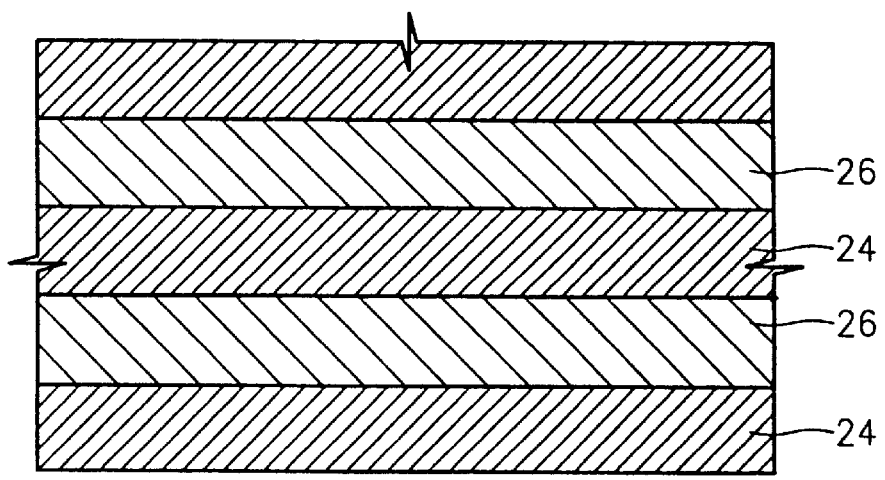
FIG. 8 is an enlarged view of the portion "B" shown in FIG. 7.

FIG. 7 is a rear view of the optical fiber arrangement substrate 24, and FIG. 8 is an enlarged view of the portion "B" shown in FIG. 7. Referring to FIGS. 7 and 8, the second electrode 26 is horizontally formed on the optical fiber arrangement substrate 24.

Figure 9A:
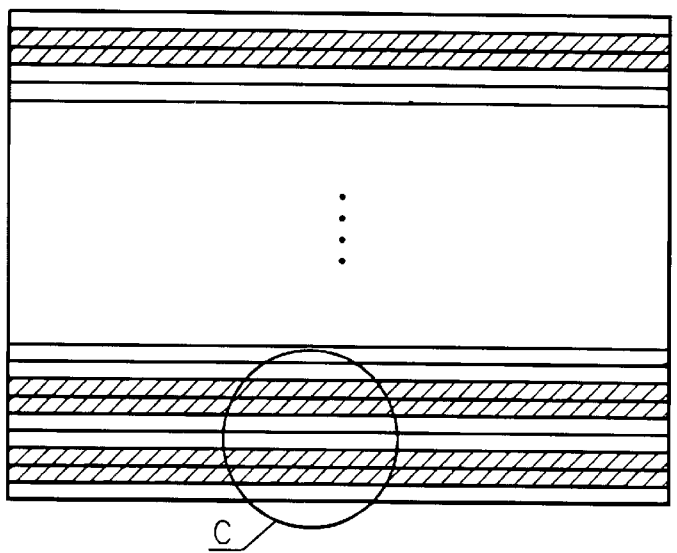
FIGS. 9a and 9b shows front and rear views of a protective plate to which cladding-free cylindrical optical fibers are fixed.
Figure 9B:
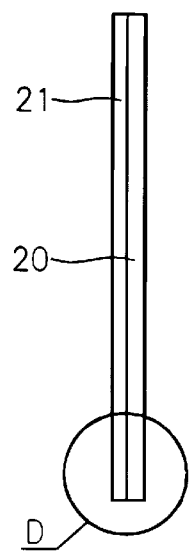
Figure 10A:
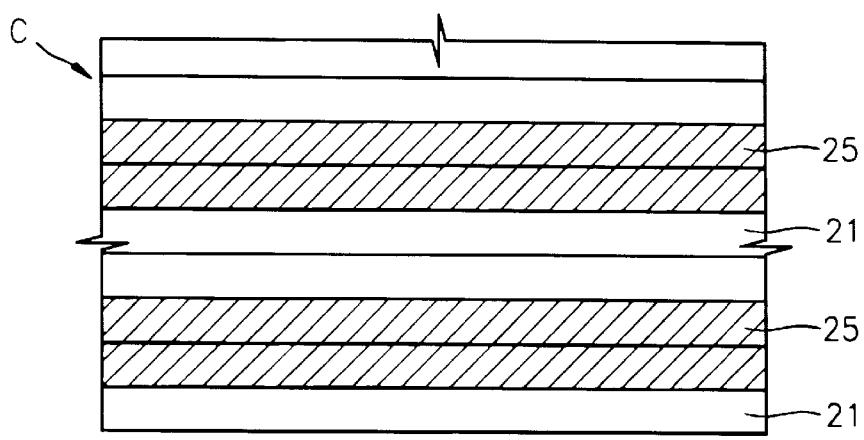
FIGS. 10a and 10b shows enlarged views of parts "C" and "D" shown in FIG. 9.
Figure 10B:
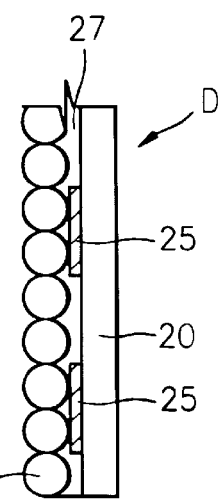

FIGS. 9a and 9b illustrates front and side views of a protective plate to which a cladding-free cylindrical optical fiber is fixed, and FIGS. 10a and 10b illustrates enlarged views of portions "C" and "D" shown in FIGS. 9a and 9b. Referring to FIGS. 9a, 9b, and 10a, 10b a cladding-free cylindrical optical fiber 21 is connected to a protective plate 20 made of a transparent material, on which a first electrode 25 is formed, by an optical adhesive 27.

Figure 11:
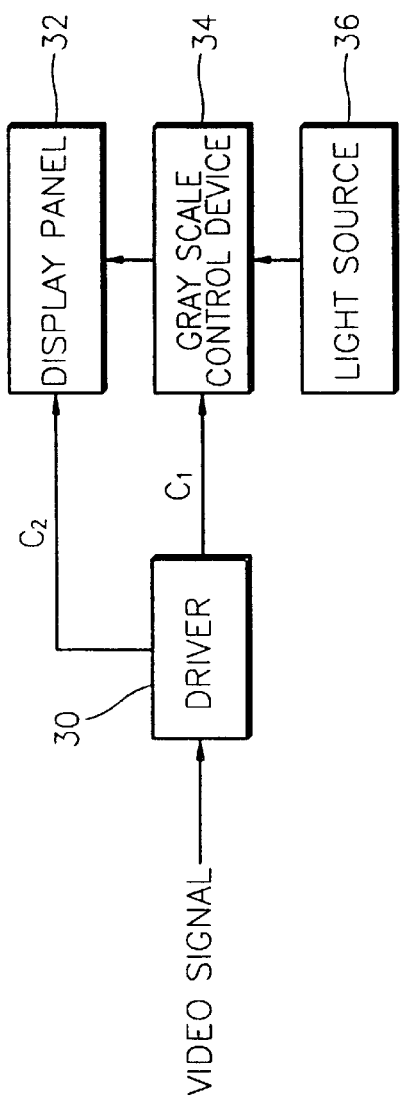
FIG. 11 is a block diagram of a flat-panel display device using an optical waveguide according to the present invention.

FIG. 11 is a block diagram of a flat-panel display device using an optical waveguide according to the present invention. Referring to FIG. 11, the flat-panel display device using an optical waveguide according to the present invention includes a light source 36 for emitting light, a gray scale control device 34 for controlling the brightness of the light output from the light source 36, a display panel 32 for receiving the light output from the gray scale control device 34 and displaying the same, and a driver 30 for applying control signals $C_1$ and $C_2$ to the gray scale control device 34 and the display panel 32, respectively, according to a video signal.

In the flat-panel display device using an optical waveguide according to the present invention, constructed as described above, the brightness of the light output from the light source 36 is controlled by the gray scale control device 34 in accordance with the control signal $C_1$ output from the driver 30, and light having passed through the gray scale control device 34 is sequentially displayed on the display panel 32 in accordance with the $C_2$ output from the driver 30. The operation of the display panel 32 is the same as that described with reference to FIG. 3 and thus an explanation thereof will be omitted.

Figure 12A:
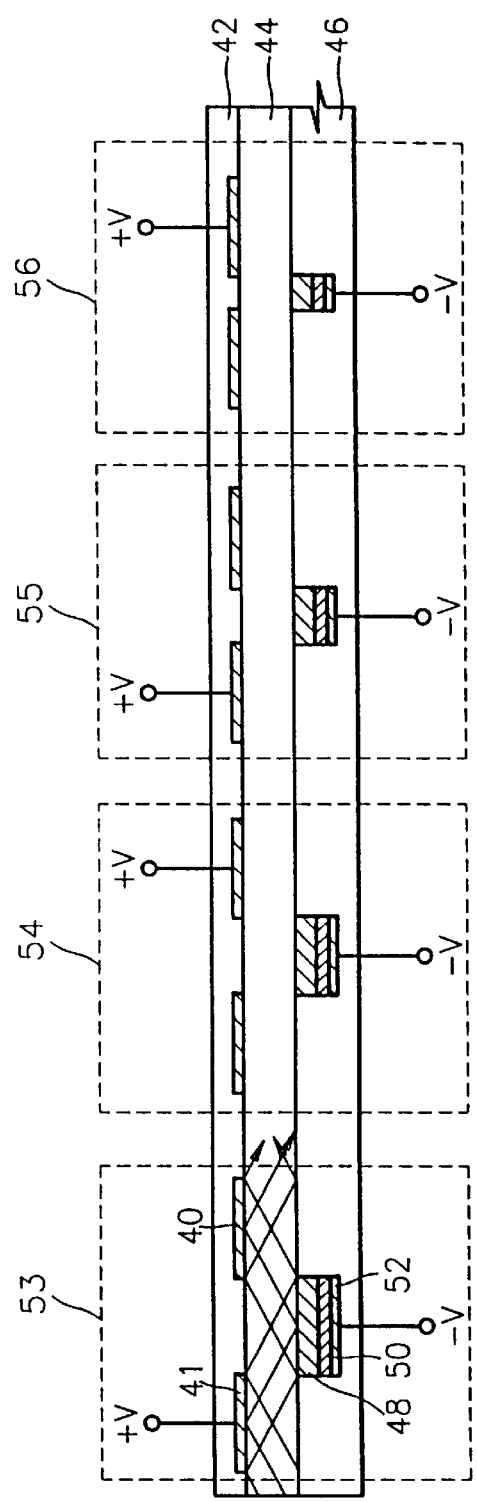
FIG. 12A illustrates gray scale control units.

The gray scale control device 34 includes a plurality of gray scale control units shown in FIG. 12A. Each gray scale control unit has four gray scale controllers 53, 54, 55 and 56. Each of the gray scale controllers 53, 54, 55 and 56 shown in FIG. 12A includes a cladding-free rectangular-section optical fiber 44, an optical fiber arrangement substrate 46, a liquid crystal layer 48, a light absorption layer 50, a third electrode 40, a fourth electrode 41, a fifth electrode 52, and a protective plate 42. The light emitted from the light source 36 is incident onto the cladding-free rectangular-section optical fiber 44. The cladding-free rectangular-section optical fiber 44 is arranged on the optical fiber arrangement substrate 46 which is made of a material having a low refractive index so as to totally reflect light propagated through the cladding-free rectangular-section optical fiber 44. The liquid crystal layer 48 is positioned between the cladding-free rectangular-section optical fiber 44 and the optical fiber arrangement substrate 46 and is made of a material whose refractive index changes in accordance with an electric field so as to serve as a light transmission controller. The light absorption layer 50 is positioned under the liquid crystal layer 48 and absorbs the light transmitted to the liquid crystal layer 48 when the light propagated through the cladding-free rectangular-section optical fiber 44 is transmitted to the liquid crystal layer 48 due to an electric field being applied. The third and fourth electrodes 40 and 41 are positioned on the cladding-free rectangular-section optical fiber 44, are made of a conductive material, and to which the control signal $C_1$ is applied from the driver 30. The fifth electrode 52 is positioned between the light absorption layer 50 and the optical fiber arrangement substrate 46 and is made of a transparent material which produces electric fields in conjunction with the third and fourth electrodes 40 and 41, respectively. The protective plate 42 is positioned on the cladding-free rectangular-section optical fiber 44 and the third and fourth electrodes 40 and 41 and totally reflects the light propagated through the cladding-free rectangular-section optical fiber 44.

In order to delicately control the brightness of the light output from the gray scale control device 34, the areas of the liquid crystal layers 48 of the four gray scale controllers 53, 54, 55 and 56 are made to be different from one another.

The operation of the gray scale control device 34 constructed as described above will be described with reference to FIGS. 12B and 12C.

Figure 12B:
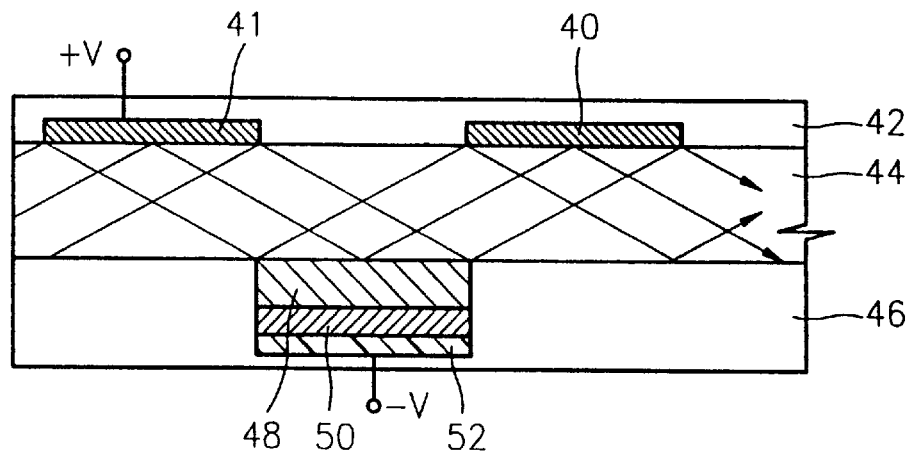
FIGS. 12B and 12C are detailed diagrams of the gray scale control units.

FIG. 12B shows the case where no voltage is applied to the third electrode 40, a predetermined positive voltage (+V) is applied to the fourth electrode 41 and a predetermined negative voltage (-V) is applied to the fifth electrode 52. The direction of orientation of liquid crystal molecules in the liquid crystal layer 48 is parallel to the orientation direction of the cladding-free rectangular-section optical fiber 44, that is, the refractive index of the liquid crystal layer 48 satisfies the condition for total reflection. Thus, the light incident from the light source 36 16 undergoes total reflection to then be propagated through the cladding-free rectangular-section optical fiber 44.

Figure 12C:
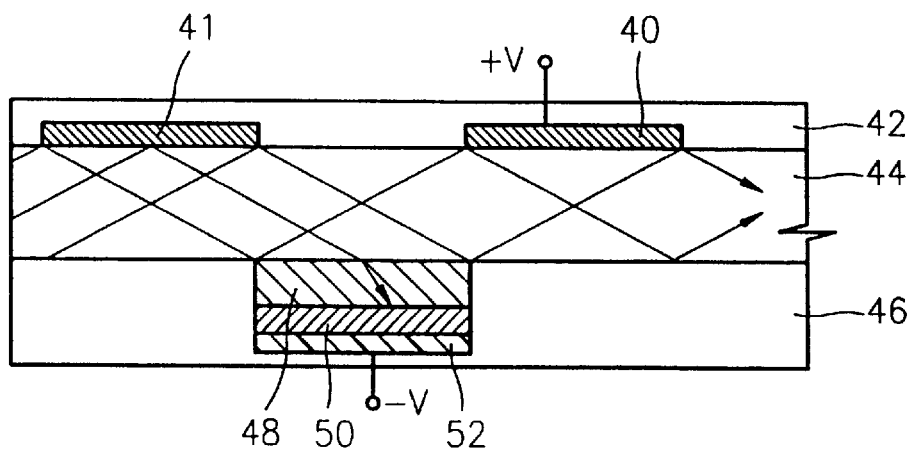

FIG. 12C shows the case where no voltage is applied to the fourth electrode 41, a predetermined positive voltage (+V) is applied to the third electrode 40 and a predetermined negative voltage (−V) is applied to the fifth electrode 52. The direction of orientation of liquid crystal molecules in the liquid crystal layer 48 is changed 90° so that the refractive index of the liquid crystal layer 48 sharply increases. Thus, the light to be reflected from the liquid crystal layer 48 cannot be reflected therefrom but is transmitted through the liquid crystal layer 48 to then be absorbed into the light absorption layer 50. In such a manner, the light propagated through the cladding-free rectangular-section optical fiber 44 is partially transmitted through the liquid crystal layer 48 to then be absorbed into the light absorption layer 50, by which the brightness of the propagated light is controlled, thereby controlling the gray scale of the light. Once the gray scale of light is controlled, no voltage is applied to the third electrode 40, a predetermined positive voltage (+V) is applied to the fourth electrode 41 and a predetermined negative voltage (−V) is applied to the fifth electrode 52, as shown in FIG. 12B, thereby allowing the liquid crystal layer 48 to have a refractive index satisfying the condition for total reflection.

In order to delicately control the gray scale of light, the areas of the liquid crystal layers 48 of the four gray scale controllers 53, 54, 55 and 56 shown in FIG. 12A are made to be different from one another. Also, the gray scale of light can be much more delicately controlled by increasing the number of gray scale controllers.

Figure 13:
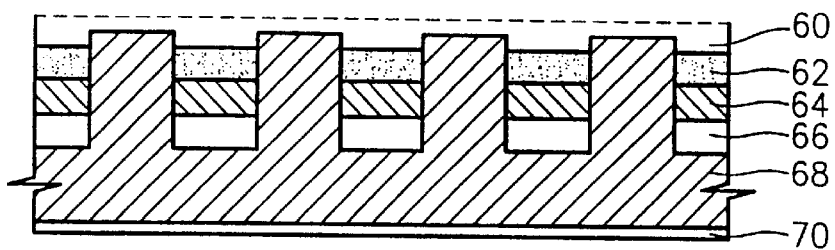
FIG. 13 is a partial transverse cross-sectional view of an optical fiber arrangement substrate in a color display panel.

FIG. 13 is a partial transverse cross-sectional view of an optical fiber arrangement substrate in a color display panel for displaying colors, in which three cladding-free rectangular-section optical fibers 62, 64 and 66 are stacked in rectangular grooves formed in an optical fiber arrangement substrate 68, a liquid crystal layer 60 is formed on the cladding-free rectangular-section optical fiber 62 and an electrode 70 is formed under the optical fiber arrangement substrate 68. The structures of a cladding-free cylindrical optical fiber and a protective plate positioned on the liquid crystal layer 60 are the same as those shown in FIG. 2 and will be omitted herein. Alternatively, in the color display panel for displaying colors, the colors can be displayed by arranging the three cladding-free rectangular-section optical fibers in three rectangular grooves formed parallel to the optical fiber arrangement substrate, respectively, rather than stacking the three cladding-free rectangular-section optical fibers in one rectangular pit.

Figure 14:
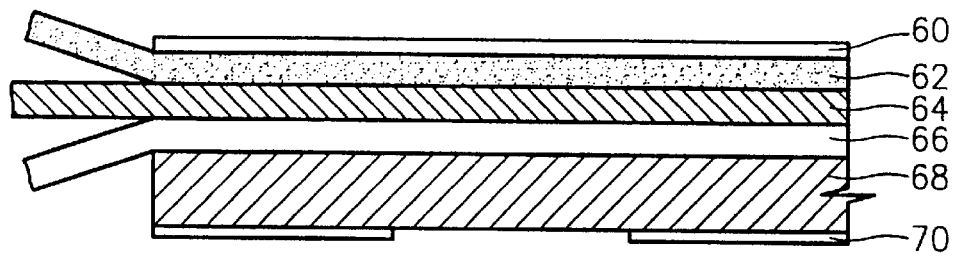
FIG. 14 is a partial lengthwise cross-sectional view of an optical fiber arrangement substrate in a color display panel.
Figure 15:
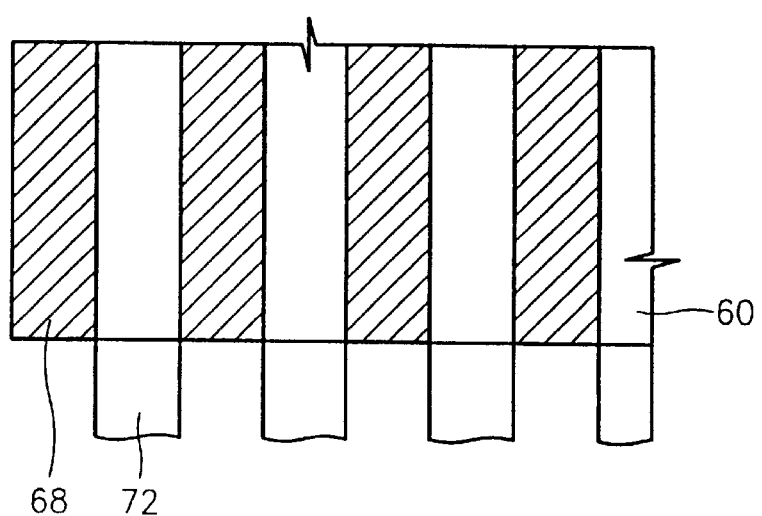
FIG. 15 is a partial front view of an optical fiber arrangement substrate in a color display panel.

FIG. 14 is a partial lengthwise cross-sectional view of an optical fiber arrangement substrate in a color display panel for displaying colors, and FIG. 15 is a partial front view thereof. Here, reference numeral 72 denotes three rectangular-section optical fibers connected to the gray scale control device 34 and into which the light output from the gray scale control device 34 is incident.

In the color display panel according to the present invention for displaying colors, the rays of three primary colors output from a light source (not shown) for emitting light of three primary colors is incident into the three cladding-free rectangular-section optical fibers 62, 64 and 66 stacked sequentially, respectively. The rays of three primary colors incident into and propagated to the three cladding-free rectangular-section optical fibers 62, 64 and 66 pass through a cladding-free cylindrical optical fiber and a protective plate to then be output to the outside as the refractive index of the liquid crystal layer 60 increases due to an electric field being applied, as described with reference to FIG. 3, thereby displaying a desired image on the display panel as a color.

Alternatively, a desired image can be displayed as a color by using a white light source and providing color filters corresponding to the respective colors in front of the three cladding-free rectangular-section optical fibers 62, 64 and 66 to propagate the light of three primary colors through the three cladding-free rectangular-section optical fibers 62, 64 and 66.

As described above, the flat-panel display device using an optical waveguide according to the present invention can greatly enhance the resolution of a reproduced image and has a very high efficiency of light and a wide viewing angle.

What is claimed is:

1. A flat-panel display device using an optical waveguide comprising:

a light source for emitting light;

a plurality of optical waveguides into which light emitted from the light source is incident;

an optical waveguide arrangement substrate on which the plurality of optical waveguides are arranges and made of a material having a low refractive index so as to totally reflect the light transmitted through the plurality of optical waveguides;

a light output controller positioned on the plurality of optical waveguides and made of a material whose refractive index changes according to an electric field;

a light output portion positioned on the light output controller, for refracting the light having passed through the light output controller when the light propagated through the plurality of optical waveguides due to the electric field is transmitted through the light output controller and is output therefrom, and outputting the same to the outside;

a first electrode positioned on the light output portion, made of a transparent conductive material, and to which a predetermined control voltage is applied; a second electrode positioned under the light output controller, made of a conductive material, and which forms an electric field in conjunction with the first electrode; and a driver for applying the predetermined control voltage to the first and second electrodes;

wherein the light output portion is formed of a plurality of cladding-free cylindrical optical fibers.

2. The flat-panel display device according to claim 1, wherein the first electrode is positioned under the optical waveguide arrangement substrate.

3. A flat-panel display device using an optical waveguide comprising:

a light source for emitting light;

a plurality of optical waveguides into which light emitted from the light source is incident;

an optical waveguide arrangement substrate on which the plurality of optical waveguides are arranges and made of a material having a low refractive index so as to totally reflect the light transmitted through the plurality of optical waveguides;

a light output controller positioned on the plurality of optical waveguides and made of a material whose refractive index changes according to an electric field;

a light output portion positioned on the light output controller, for refracting the light having passed through the light output controller when the light propagated through the plurality of optical waveguides due to the electric field is transmitted through the light output controller and is output therefrom, and outputting the same to the outside;

a first electrode positioned on the light output portion, made of a transparent conductive material, and to which a predetermined control voltage is applied; a second electrode positioned under the light output controller, made of a conductive material, and which forms an electric field in conjunction with the first electrode; and a driver for applying the predetermined control voltage to the first and second electrodes, wherein the plurality of optical waveguides are cladding-free rectangular-section optical fibers.

4. The flat-panel display device according to claim 1, wherein the light output controller is a liquid crystal layer.

5. The flat-panel display device according to claim 1, further comprising a transparent protective plate on which the first electrode is formed, wherein the protective plate is adhered to the light output portion by an optical adhesive.

6. A flat-panel display device using an optical waveguide comprising:

a light source for emitting light;

a plurality of optical waveguides into which light emitted from the light source is incident;

an optical waveguide arrangement substrate on which the plurality of optical waveguides are arranges and made of a material having a low refractive index so as to totally reflect the light transmitted through the plurality of optical waveguides;

a light output controller positioned on the plurality of optical waveguides and made of a material whose refractive index changes according to an electric field;

a light output portion positioned on the light output controller, for refracting the light having passed through the light output controller when the light propagated through the plurality of optical waveguides due to the electric field is transmitted through the light output controller and is output therefrom, and outputting the same to the outside;

a first electrode positioned on the light output portion, made of a transparent conductive material, and to which a predetermined control voltage is applied;

a second electrode positioned under the light output controller, made of a conductive material, and which forms an electric field in conjunction with the first electrode; and a driver for applying the predetermined control voltage to the first and second electrodes, wherein the light source is a light source for emitting light of three primary colors for displaying colors, and each of the plurality of optical waveguides further includes three optical waveguides for propagating the light of three primary colors emitted from the light source.

7. A flat-panel display device using an optical waveguide comprising:

a light source for emitting light;

a plurality of optical waveguides into which light emitted from the light source is incident;

an optical waveguide arrangement substrate on which the plurality of optical waveguides are arranges and made of a material having a low refractive index so as to totally reflect the light transmitted through the plurality of optical waveguides;

a light output controller positioned on the plurality of optical waveguides and made of a material whose refractive index changes according to an electric field;

a light output portion positioned on the light output controller, for refracting the light having passed through the light output controller when the light propagated through the plurality of optical waveguides due to the electric field is transmitted through the light output controller and is output therefrom, and outputting the same to the outside;

a first electrode positioned on the light output portion, made of a transparent conductive material, and to which a predetermined control voltage is applied; a second electrode positioned under the light output controller, made of a conductive material, and which forms an electric field in conjunction with the first electrode; and a driver for applying the predetermined control voltage to the first and second electrodes, wherein the light source is a white light source for displaying colors, each of the plurality of optical waveguides further includes three optical waveguides, and colors filters for three primary colors are provided in front of the three optical waveguides to propagate the light emitted from the white light source into light of three primary colors.

8. A flat-panel display device using an optical waveguide comprising:

a light source for emitting light;

a plurality of optical waveguides into which light emitted from the light source is incident;

an optical waveguide arrangement substrate on which the plurality of optical waveguides are arranges and made of a material having a low refractive index so as to totally reflect the light transmitted through the plurality of optical waveguides;

a light output controller positioned on the plurality of optical waveguides and made of a material whose refractive index changes according to an electric field;

a light output portion positioned on the light output controller, for refracting the light having passed through the light output controller when the light propagated through the plurality of optical waveguides due to the electric field is transmitted through the light output controller and is output therefrom, and outputting the same to the outside;

a first electrode positioned on the light output portion, made of a transparent conductive material, and to which a predetermined control voltage is applied;

a second electrode positioned under the light output controller, made of a conductive material, and which forms an electric field in conjunction with the first electrode; and a driver for applying the predetermined control voltage to the first and second electrodes, wherein a gray scale control device for controlling the brightness of the light output from the light source is further provided between the light source and the plurality of optical waveguides, and the brightness of the light output from the gray scale control device is controlled in accordance with a light brightness control signal output from the driver.

9. A flat-panel display device using an optical waveguide comprising:

a light source for emitting light;

a plurality of optical waveguides into which light emitted from the light source is incident;

an optical waveguide arrangement substrate on which the plurality of optical waveguides are arranges and made of a material having a low refractive index so as to totally reflect the light transmitted through the plurality of optical waveguides;

a light output controller positioned on the plurality of optical waveguides and made of a material whose refractive index changes according to an electric field;

a light output portion positioned on the light output controller, for refracting the light having passed through the light output controller when the light propagated through the plurality of optical waveguides due to the electric field is transmitted through the light output controller and is output therefrom, and outputting the same to the outside;

a first electrode positioned on the light output portion, made of a transparent conductive material, and to which a predetermined control voltage is applied;

a second electrode positioned under the light output controller, made of a conductive material, and which forms an electric field in conjunction with the first electrode; and a driver for applying the predetermined control voltage to the first and second electrodes, wherein the gray scale control device comprises a plurality of gray scale control units having a predetermined number of gray scale controllers formed in series, each gray scale controller comprising:

an optical waveguide into which the light emitted from the light source is incident;

an optical waveguide arrangement substrate on which the optical waveguide is arranged and made of a material having a low refractive index so as to totally reflect the light transmitted through the optical waveguide;

a light transmission controller positioned between the optical waveguide and the optical waveguide arrangement substrate and made of a material whose refractive index changes according to an electric field;

a light absorption layer positioned under the light transmissions controller, for absorbing the light transmitted to the light transmission controller when the light propagated through the optical waveguide is transmitted to the light transmission controller due to the electric field;

third and fourth electrodes positioned on the optical waveguide, made of a conductive material and to which the light brightness control signal is applied from the driver;

a fifth electrode positioned between the light absorption layer and the optical fiber arrangement substrate and made of a transparent material which produces electric fields in conjunction with the third and fourth electrodes, respectively; and a protective plate positioned on the optical waveguide and the third and fourth electrodes, for totally reflecting the light propagated through the optical waveguide.

10. The flat-panel display device according to claim 9, wherein the areas of the light transmission controllers of the plurality of gray scale controllers are made to be different from one another in order to delicately control the brightness of the light output from the gray scale control device.

* * * * *